United States Patent [19]

Sakoda et al.

[11] Patent Number: 4,692,896
[45] Date of Patent: Sep. 8, 1987

[54] METHOD OF PROCESSING A PLURALITY OF CODE SYSTEMS

[75] Inventors: Kousuke Sakoda, Hino; Masahiro Kainaga, Yokohama; Hidehiko Akita, Tokyo; Fumiya Murata, Hadano; Yoshitake Nakaosa, Yokohama, all of Japan

[73] Assignee: Hitachi, Ltd., Tokyo, Japan

[21] Appl. No.: 752,853

[22] Filed: Jul. 8, 1985

[30] Foreign Application Priority Data

Jul. 6, 1984 [JP] Japan .................................. 59-139002

[51] Int. Cl.⁴ .............................................. G06F 5/00
[52] U.S. Cl. ...................................... 364/900; 364/300
[58] Field of Search ... 364/200 MS File, 900 MS File, 364/ 300 MS File

[56] References Cited

U.S. PATENT DOCUMENTS

| | | | |
|---|---|---|---|
| 4,068,300 | 1/1978 | Bachman | 364/200 |
| 4,325,120 | 4/1982 | Colley et al. | 364/200 |
| 4,445,177 | 4/1984 | Bratt et al. | 364/200 |
| 4,455,602 | 6/1984 | Baxter et al. | 364/200 |
| 4,493,029 | 1/1985 | Hatz et al. | 364/200 |

Primary Examiner—David Y. Eng
Attorney, Agent, or Firm—Antonelli, Terry & Wands

[57] ABSTRACT

A method of processing a plurality of different code systems for an information processing apparatus including an operating system, comprises a step of inputting a source program, and a compiling step of analyzing meaning of the source program to thereby create a series of instructions and data required for executing a processing equivalent to the meaning of the source program. The compiling step includes a sub-step of transforming character type constants to a first code system occupying region including a first number of bits and transforming character string constants to a second code system occupying a region including a number of bits which is equal to product of a sum of the number of characters of the character string constants plus one and multiplied with the first bit number so that character type variables designated in the source program correspond, respectively, to the region of the first bit number while a character type array corresponds to a region including a number of bits which is equal to a product resulting from multiplication of the first bit number with the number of elements of the array.

12 Claims, 20 Drawing Figures

FIG. 4

```
char    Cl,                    ──31
        Ca [ ] = "defg",       ──32
        Cn [ 8 ] ;             ──33
Cl = 'x' ;                     ──34
append ("abc", ca, cn);        ──35
```

FIG. 5

"漢" ──→ 16-BIT KANJI CODE ──36

"a" ──→ 16-BIT KANJI CODE ──37

"/a" ──→ 16-BIT CODED 8-BIT CODE$_{(a)}$ ──38

"//" ──→ 16-BIT CODED 8-BIT CODE$_{(/)}$ ──39

"\!" ──→ 16-BIT KANJI CODE$_{(/)}$ ──40

"\0" ──→ CODE OF 16 BITS ALL OF "0" ──41

"\\" ──→ 16-BIT KANJI CODE$_{(\)}$ ──42

"/\\" ──→ 16-BIT KANJI CODE$_{(\)}$ ──43

FIG. 7

| | | | | | |
|---|---|---|---|---|---|
| 1 | 1 | | 1 | ASSIGNMENT | 2 | 3 |
| 2 | 4 | | 2 | VARIABLE | 1 | — |
| | | | 3 | CONSTANT | 2 | — |
| | | | 4 | CALLING OF FUNCTION | 1 | — |
| | | | 5 | CONSTANT | 3 | — |
| | | | 6 | VARIABLE | 2 | — |
| | | | 7 | VARIABLE | 3 | — |

70 → 71, 72, 73

| | 74 | 75 | 76 | 77 | 78 |
|---|---|---|---|---|---|
| 1 | C1 | CHARACTER TYPE | INITIAL VALUE ABSENT | LENGTH = 1 | ADDRESS = |
| 2 | Ca | CHARACTER TYPE | 1 | LENGTH = 5 | ADDRESS = |
| 3 | Cn | CHARACTER TYPE | INITIAL VALUE ABSENT | LENGTH = 8 | ADDRESS = |

| | 83 | 84 | 85 |
|---|---|---|---|
| 1 | append | NUMBER OF ARGUMENTS = 3 | ADDRESS = |

| | 79 | 80 | 81 | 82 |
|---|---|---|---|---|
| 1 | CHARACTER TYPE | LENGTH = 5 | ADDRESS = | 1 |
| 2 | CHARACTER TYPE | LENGTH = 1 | ADDRESS = | 6 |
| 3 | CHARACTER TYPE | LENGTH = 4 | ADDRESS = | 7 |

| 1 | 2 | 3 | 4 | 5 | 6 | 7 | 8 | 9 | 10 | 86 |
|---|---|---|---|---|---|---|---|---|---|---|
| 'd' | 'e' | 'f' | 'g' | ' ' | 'x' | 'a' | 'b' | 'c' | ' ' | |

FIG. 8
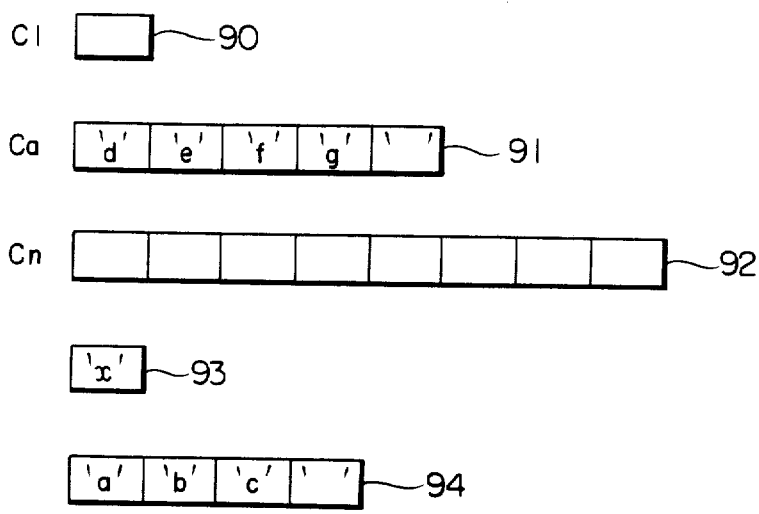
FIG. 9
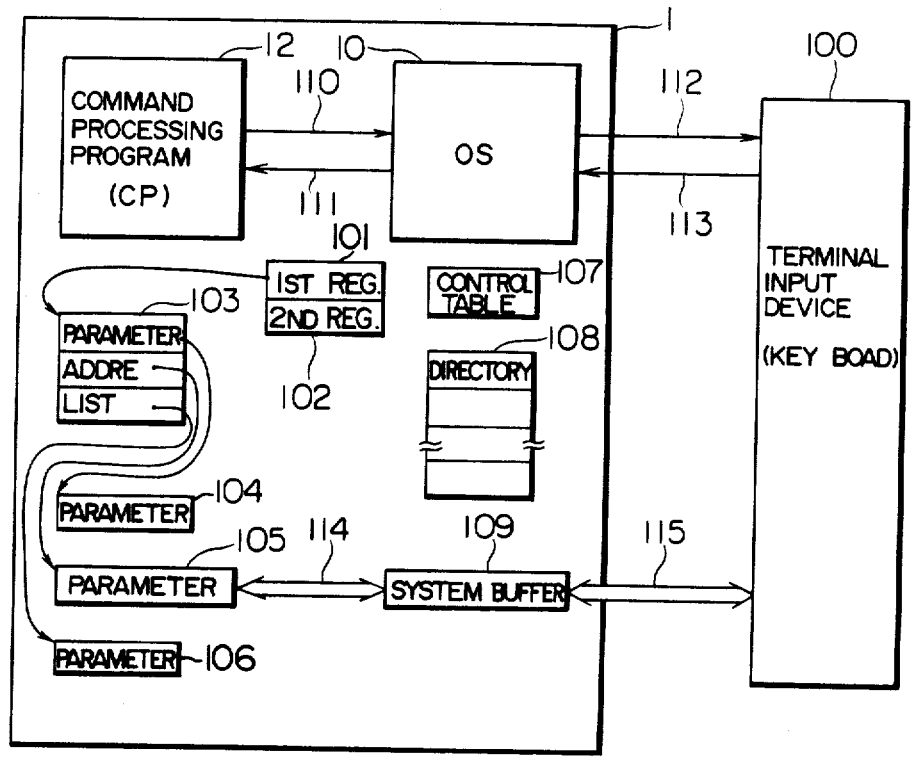
FIG. 10
COMPLETION CODE = MACRO NAME (1ST ARGUMENT, 2ND ARGUMENT,...)
~119

FIG. 11

| | | | |
|---|---|---|---|
| CC | = | open (name, buf, fd) | ~120 |
| CC | = | read (fd, n) | ~121 |
| CC | = | write (fd, n) | ~122 |
| CC | = | close (fd) | ~123 |
| CC | = | create (name, code) | ~124 |
| CC | = | inquire (name, code) | ~125 |
| CC | = | change (name, code) | ~126 |

FIG. 12

```
    ⋮
int  cc;                          ~131
char buf;                         ~132
struct FDT *fd;                   ~133

CC = open ( console , buf, fd);   ~134
if (CC = 0)    error (CC);        ~135
CC = read (fd, 1);                ~136
    ⋮
```

| INPUT CODES \ OUTPUT CODES | NON-CHARACTER CODE | JIS 8-BIT CODE | ADMIXED CODES OF EBCDIK CODE AND KEIS KANJI CODE (SHIFT CODE IS USED) | COORDINATED 16-BIT CODE |
|---|---|---|---|---|
| NON-CHARACTER CODE | 1 | 1 | 1 | 1 |
| JIS 8-BIT CODE | 1 | 1 | 2 | 4 |
| ADMIXED CODES OF EBCDIK CODE AND KEIS KANJI CODE (SHIFT CODE IS USED) | 1 | 3 | 1 | 6 |
| COODINATED 16-BIT CODE | 1 | 5 | 7 | 1 |

METHOD OF PROCESSING A PLURALITY OF CODE SYSTEMS

BACKGROUND OF THE INVENTION

1. Field of the Invention

The present invention generally relates to an information or data processing method and system for handling multi-bit character codes inclusive of Kanji (Chinese character) code and other codes. In particular, the invention concerns an information processing method which is advantageously suited for applications where a plurality of different code systems are admixedly employed.

2. Description of the Prior Art

In the information or data processing by using electronic computers, code systems for representing characters are prescribed. For representing alphanumeric characters, Kana (the Japanese alphabets) and symbols, an 8-bit code system is to be used, while a 16-bit code system is used for characters including Kanji or Chinese characters. The 8-bit code system includes JIS (Japanese Industrial Standard) 8-bit code, ASCII code, EBCDIC code, EBCDIK code and others. On the other hand, the 16-bit code system includes JIS Kanji code, KEIS Kanji code, shift JIS code and others. Particularly in the case of the information processing where Japanese language is dealt with, use of Kanji is indispensable, which does not necessarily means that the 8-bit codes for alphanumeric characters can be omitted in the process, because some process may require use of conventional data given in the form of the 8-bit codes. Under the circumstance, there exists need for use of one 8-bit code system and one 16-bit code system in an admixed manner. As a method of making it possible to use both of these codes admixedly, it is known to insert a shift code between an 8-bit code and a 16-bit code so that the code type can be identified by the presence of the shift code. However, the information processing adopting the above method suffers a serious drawback in that every shift code has to be checked for processing the admixed type data, rendering thus very complicate the design of program. To dispose of this problem, there have been proposed methods or means mentioned below.

In the case of the shift JIS code, an 8-bit code which is not generally used as a character code of the 8-bit code system is employed as the eight most significant bits (MSB) of the 16-bit Kanji code. In that case, it is possible to readily discriminate whether a given 8 MSB bits represent the MSB bits of the 16-bit code or a code of the 8-bit code system, whereby use of the shift code is rendered unnecessary, while the ratio of the amount of displayed contents to the amount of the amount of coded data is advantageously always constant. However, it still involves a problem that discrimination between the 8-bit code and the 16-bit code is required.

As another method, it is known to add to the code of the 8-bit code system an 8-bit pattern which differs from any code of the 8-bit code system, to thereby handle all the codes as 16-bit codes which may be referred to as "coordinated 16-bit codes". According to this known method, all character data can be handled commonly as the 16-bit codes, whereby the processing is facilitated while assuring proportionality between the number of characters and the amount of data.

It should be mentioned here that alphanumeric characters can be represented by both the 8-bit code and the 16-bit code. In that case, an alphanumeric there is generally no specific relationship or similarity between the 8-bit code and the 16-bit code representing the same alphanumeric character. However, it is sometimes desired to use both 8-bit and 16-bit codes having the same coding for representing the same character, but displayed or printed in different forms. In that case, a code system disclosed in Japanese Patent Application No. 135819/1983 may be used.

By the way, in the hitherton known compiler, character-type data representing characters are each of eight bits. When the 16-bit code are handled, two data areas are allocated to the 16-bit code. In other words, data of the 16-bit code is treated as two pieces of character-type data in the compiler. Recognition of the two pieces of character-type data as a code of the 16-bit code system must exclusively rely on the preparation or design of program, thus giving rise to an obstacle to development of program and maintenance.

In the foregoing, only the problem encountered when a mixture of 8-bit code system and 16-bit code system is handled has been elucidated. However, there arise other problems when it is required to handle input/output units or CPU in which other than standard code systems are used, as will as those files in which data are stored according to such non-standard code system according to a program using the standard code system. For handling the data of the non-standard code system, the contents of data which are stored, for example, in a file may be read out after conversion or transformation by using a program prepared for code transformation. However, when the data are to be directly transferred with the input/output units or other CPU where the nonstandard code is employed, the data has to be once stored in a file for code transformation, which means the necessity of additional procedure for code transformation resulting in time consumable work.

Further, when there exist an executable program made by a non-standard compiler and/or an executable program for processing non-standard codes fetched from other system by way of a communication controller or a secondary memory, in addition to an executable program made by a standard compiler using a standard code, it is necessary to transform reversely the data of the standard code system to those of the non-standard code system or modify the executable program for the non-standard code system.

In general, in a conversational type information processing system using an electronic computer, management and control of the input terminal device (e.g. key board), output terminal device (e.g. display), secondary memory and the communication controller (generally called hereinafter as input/output terminal devices), as well as the processing for loading into a main memory the executable program stored in the secondary memory or inputted through the communication controller and the control of execution of the executable program stored in the main memory are all realized by the operating system (hereinafter also referred to as OS). In that case, the executable program requests the processing and control thereof to the OS through macro instructions. In most cases, difference in the content of the request is discriminated based on the type of macro instructions while the object of the request is represented by parameters of the macro instructions. In this manner, the common processings required for management of resources for the whole system are performed by the OS.

In the hitherto known OS, when receiving from or supplying to input/output devices codes belonging to the 8-bit code system, those codes are transformed to the code system used in input/output devices or to a specific code system specified by user. However, the aforementioned problems remain to be solved.

SUMMARY OF THE INVENTION

An object of the present invention is to provide an information processing method used in an information processing system incorporating an electronic computer, which method allows codes of different bit numbers to be handled coordinately or uniformly and in which program can be prepared and executed for data transfer with input/output devices and others adopting a code system differing from the coordinated code system without taking into consideration the difference between the former and the latter, while a program prepared based on a code system different from the coordinated code system, can be executed without necessity of the users work for modification thereof or code transformation.

In order to allow the 8-bit code and the 16-bit code to be processed in the admixed state, it is required to establish a coordinated processing mode for operating the whole system. The mere use of two 8-bit data areas as used in the case of the prior art imposes a great burden on the programmer. Further, even when coordination or uniformity is realized internally within a system, there still exist needs for utilization of external data (file) and/or input/output devices using different code systems and code lengths. Besides, there may arises a need for making use of external programs prepared for processing code systems different from the coordinated code system.

The various problems mentioned above can not be solved when the system arrangement is left unchanged or modified only partially. More comprehensive measures must be provided.

In the light of the above, the present invention has features in that the codes are coordinated or uniformized at the level of compiler and that the OS manages the types of the code systems used in programs and files, as well as input/output devices so that code transformation is carried out in the course of input/output control effected by the OS upon inputting/outputting of data.

BRIEF DESCRIPTION OF THE DRAWINGS

FIG. 4 is a view for illustrating an example of a source program;

FIG. 5 is a view for illustrating exemplary description of character type data;

FIG. 7 is a view for illustrating a table structure for various information made by the compiler;

FIG. 8 is a view for illustrating, by way of example, character type data made by the compiler;

FIG. 9 is a functional block diagram for illustrating procedure of executing a macro instruction;

FIG. 10 is a view showing a general formula of the macro instruction;

FIG. 11 is a view for illustrating examples of the macro instruction;

FIG. 12 is a view for illustrating an example of data input program;

DESCRIPTION OF THE PREFERRED EMBODIMENTS

In the following, the invention will be described in detail by referring to the accompanying drawings which show exemplary embodiments of the invention.

Figure 1:
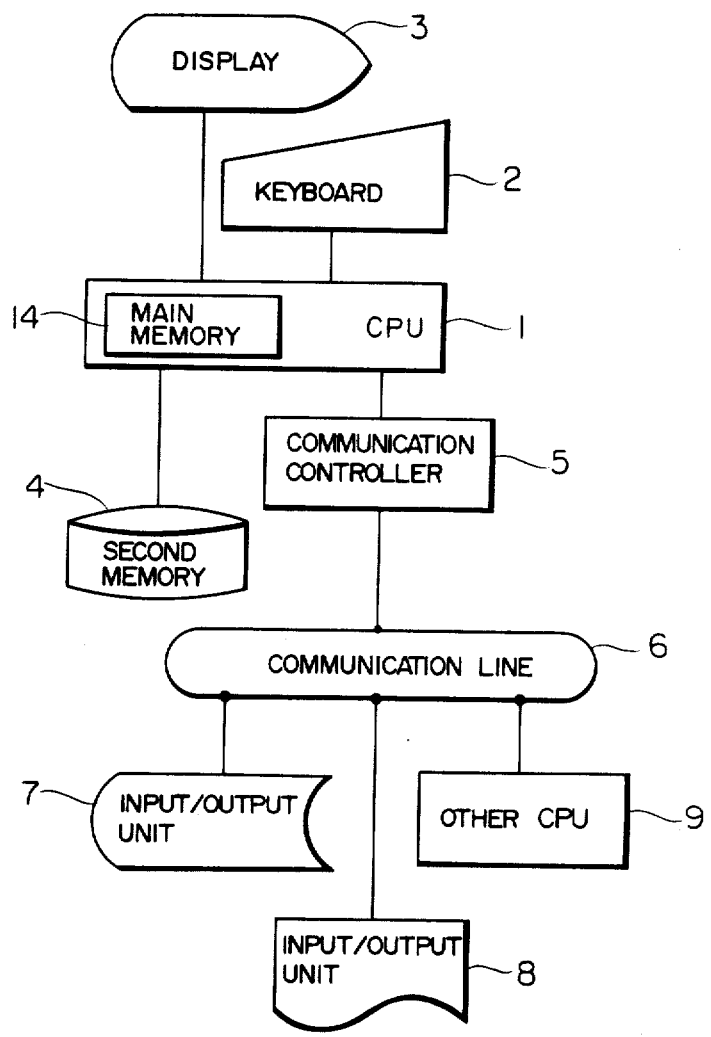
FIG. 1 is a view showing schematically a hardware arrangement of a system for carrying out an information processing method according to an embodiment of the present invention.
Figure 2:
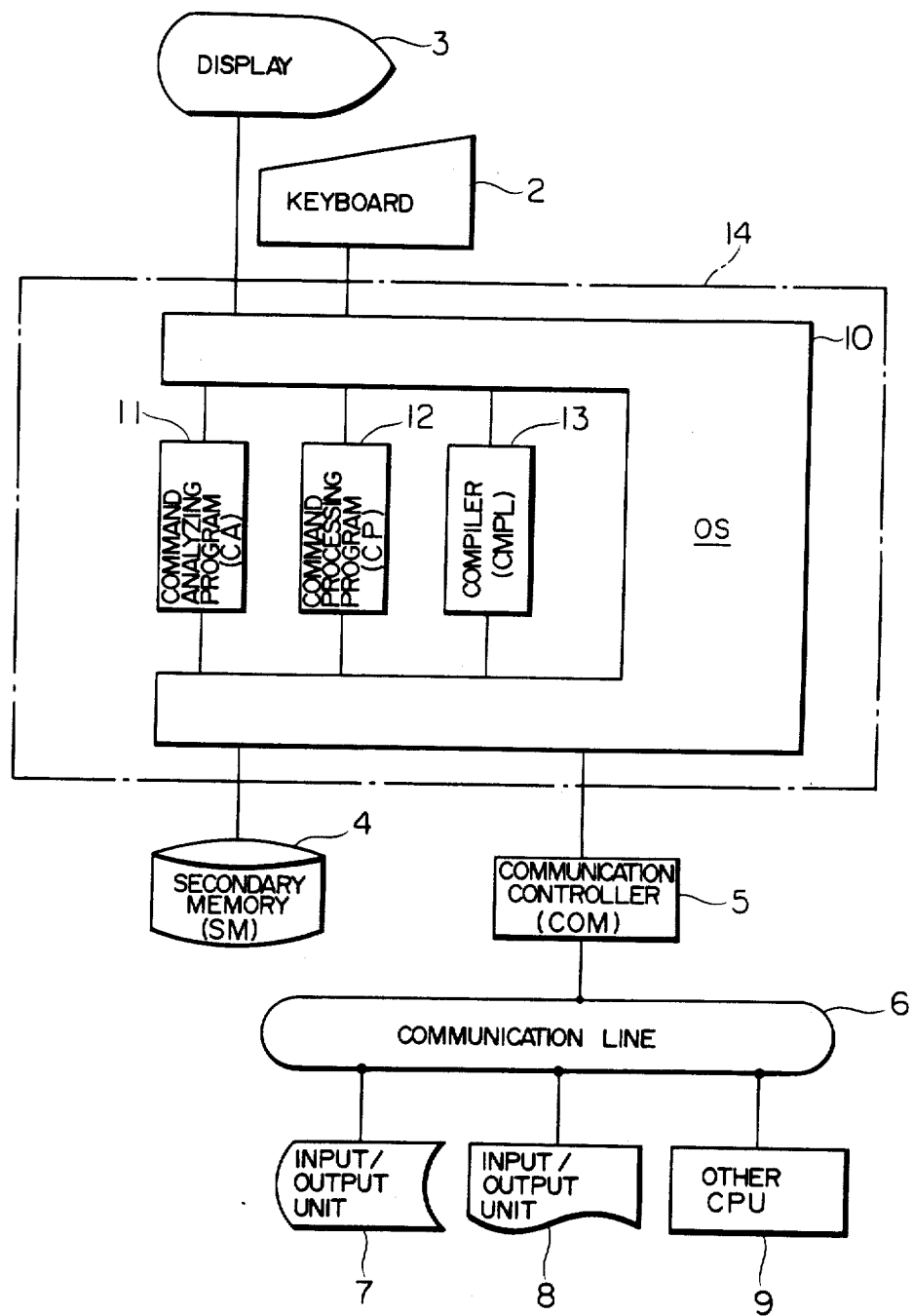
FIG. 2 is a diagram showing schematically a general arrangement of an information processing system inclusive of software according to an embodiment of the invention.

FIG. 1 shows a general arrangement of an information or data processing system for carrying out the method according to the invention. Referring to the figure, a central processing unit 1 (hereinafter referred to as CPU in abbreviation) incorporates a main memory 14 (also referred to as MM in abbreviation) and has connected thereto an input terminal or key board 2, an output terminal or display 3, a secondary memory 4 and a communication controller 5. Connected to the communication controller 5 through a communication line 6 are other input/output units 7 and 8 and other CPU 9. Referring to FIG. 2 which illustrates an arrangement of the information processing system inclusive of software, commands inputted through the key board 2 (also referred to simply as KB) is analyzed or interpreted through execution of a command analyzing program 11 (also referred simply as CA) to activate a command processing program 12 (or CP in abbreviation) by way of an operation system or OS 10. The CP 12 is inputted with data through the KB 2 (key boad) or displays data through the display unit 3 (hereinafter also referred to as DISP in abbreviation). Further, the CP 12 reads out or write data from or in the secondary memory 4 (or SM in abbreviation) and performs transmission and reception of data with the communication controller 5 (also referred to as COM) as well as the other input/output units 7 and 8 and the other CPU 9 through the communication line 6.

The command analyzing program or CA 11 activates a compiler 13 (referred to simply as CMPL) in response to a command. The compiler 13 is inputted with a source program from the secondary memory or SM 4 by way of the OS 10 to thereby make an executable program which is then stored in the MM 14 or SM 4. The executable program is activated as the command processing program or CP 12 by the CA 11 through the OS 10.

Figure 3:
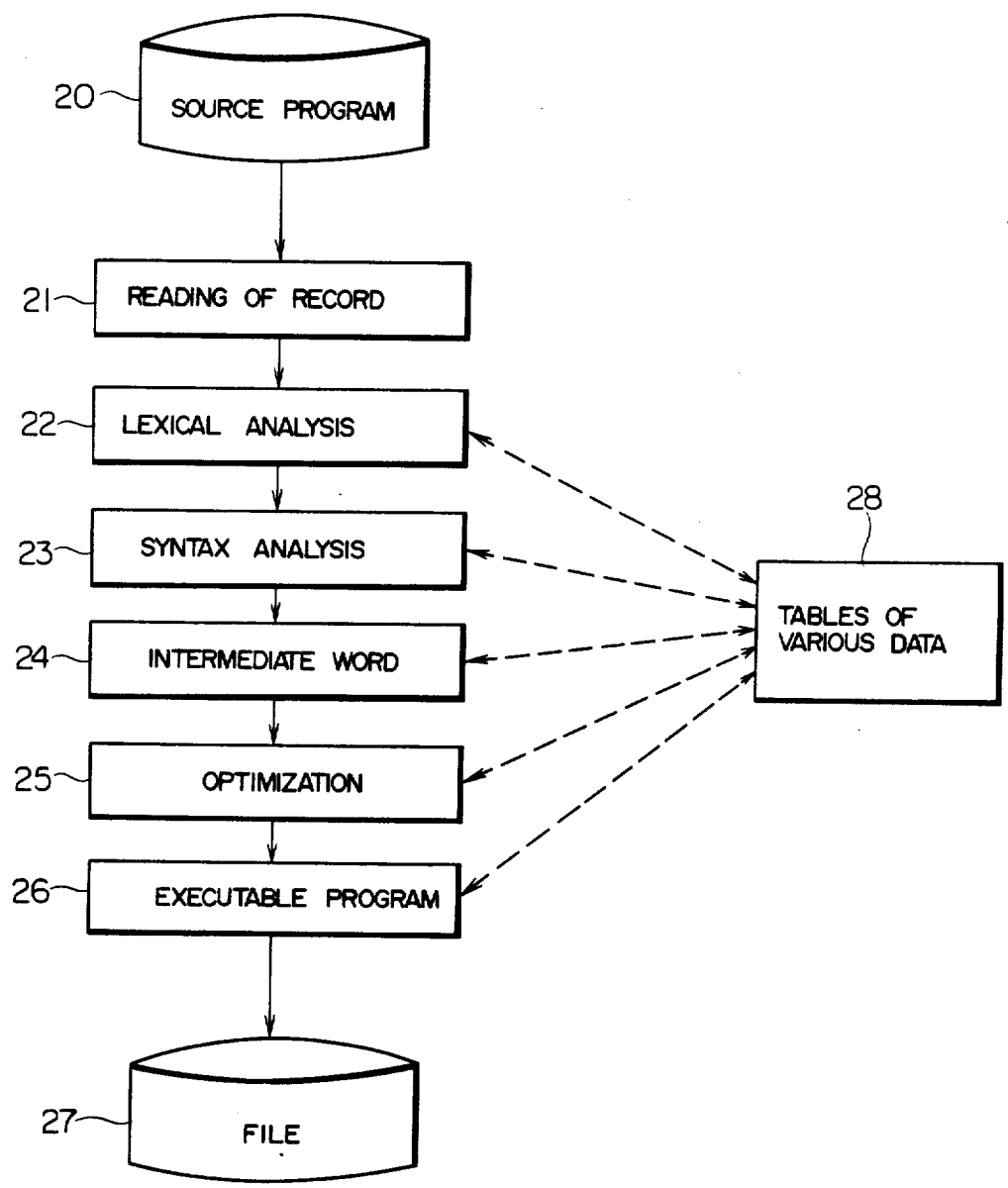
FIG. 3 is a veiw for illustrating, by way of example, a flow of processes performed by a compiler according to the invention.

More specifically, referring to FIG. 3, the CMPL 13 records the source program 20 and reads the record line by line (block 21) and decompose it into words through lexical analysis (block 22), which words are transformed into symbols. The compiler checkes as to the grammatical correctness through a syntax analysis (block 23) on the basis of the symbols as read to prepare a syntax tree which is then scanned to make an intermediate language (block 24). After optimization (block 25), an executable program is prepared (block 26) and supplied to a file 27. In the course of these processes (blocks 22 to 26), tables 28 of various information such as name table, constant table or the like are prepared and referred to. (For further particulars, reference may be made, for example, to I. Tanaka's "Compiler" published by Sangyo Tosho Company in Japan, 1981).

FIG. 4 illustrates an example of the source program written by C-language. Reference numerals 31 to 33 designate declaration statements about character type variables. More specifically, 31 denotes the declaration statement of the character type variable having an area of size corresponding to a single character of the name "C1", 32 denotes the declaration statement of the character type variable for five characters of "ca", and 33 similarly denotes the declaration statement of the character type variable for eight characters of "cn". In the declaration statement 32, the data enclosed by double quotes represents a string of characters which are assumed to be character codes including a stop code of value "O" at the end. A bracket ( ) represents an array whose magnitude is determined by the initial value on the right side to the equality sign in the case of the illustrated example. A reference numeral 34 denotes an assignment statement having the variable C1 substituted for by a character type constant "x". The data enclosed by the single guotes represents a single character. The stop code is assumed to be represented by "\O" in the character type data. A reference numeral 35 denotes a statement for calling a function named "append" and including three arguments.

Although the character type data illustrated in FIG. 4 are for English characters, it should be understood that such characters as illustated in FIG. 5 can be processed. In other words, any of the standardized or coordinated 16-bit codes can be dealt with. The Kanji (Chinese characters), alphanumeric characters and symbols are stored in the form of 16-bit codes (36, 37). The alphanumeric character or a symbol which may be of an 8-bit code is attached ahead thereof with the exclamation mark "!" represented by a code of eight bits all of "O", so as to be transformed to a 16-bit code including the added eight bits all of "O" and stored (38). In especial cases, the exclamation mark "!" itself is represented by a 16-bit coded 8-bit code (39) or a normal 16-bit, code (40). The stop code is represented by a code of 16-bits all of "O" as indicated at 41. Further, the symbol "\" is represented by a code as shown in 42 or 43.

Figure 6:
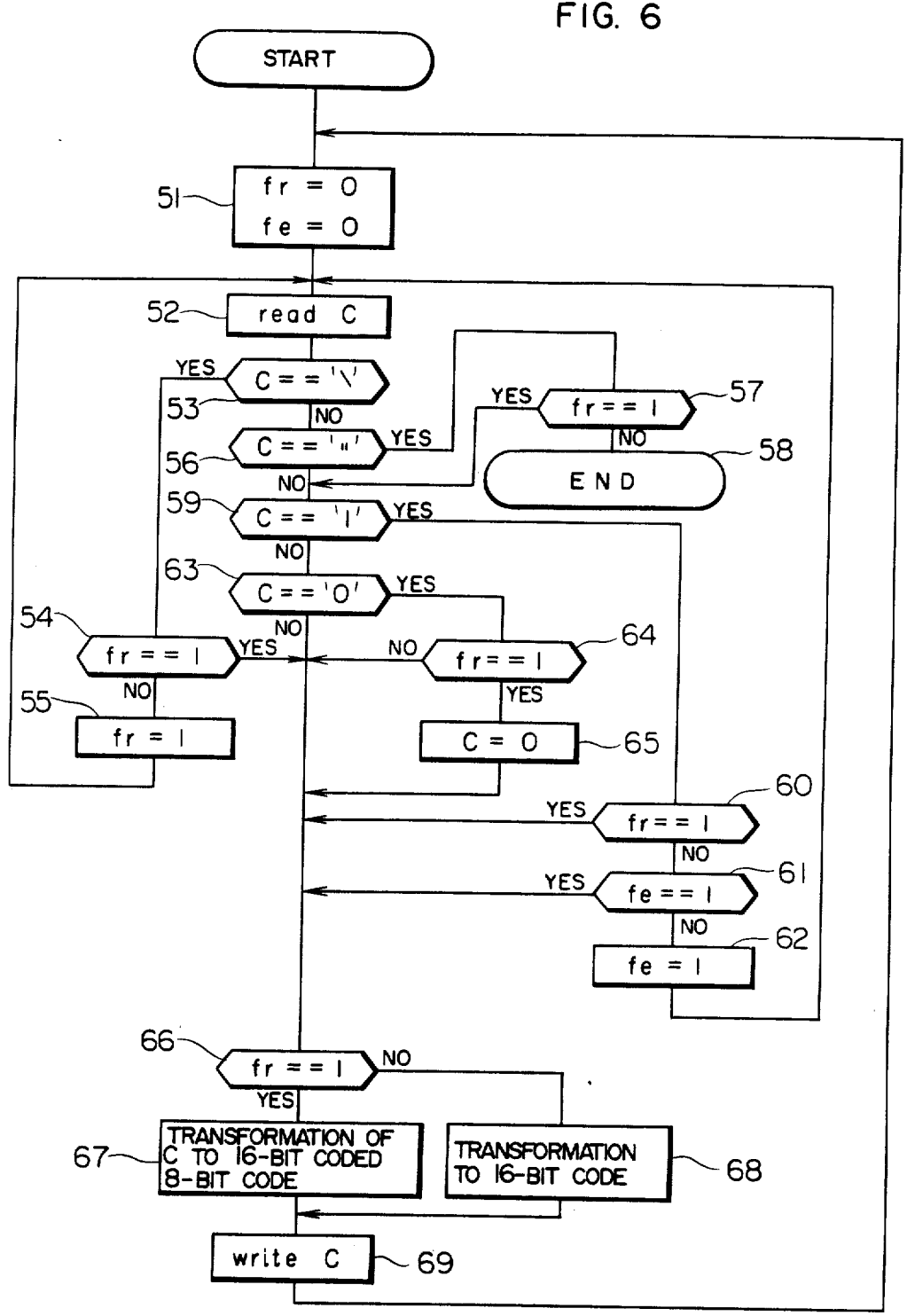
FIG. 6 is a flow diagram for illustrating analyses of the character type data.

The character type data and the character string data such as those illustrated in FIG. 5 are analyzed through the process represented by the block 22 in FIG. 3. FIG. 6 is a view illustrating a procedure for analyzing the character data succeeding to the first double quote "‥" in a character string data.

Referring to FIG. 6, at a step or block 51, a variable $f_r$ for memorizing the appearance of "\" and a variable $f_e$ for memorizing the appearance of the exclamation mark "!" are set to "Os", respectively, which is followed by a block 52 where the succeeding one character of the character string is inputted. At blocks 53, 56, 59 and 63, the inputted character is identified. If the inputted character is "\", the variable $f_r$ is set to "1" at a block 54 if it is still "O" and the block 52 is regained. If $f_r$ is already "1", the procedure proceeds to a block 66. On the other hand, when the inputted character is the double guote "‥", this means the end or stop of the character string, if the variable $f_r$ is "O". Then, the processing comes to an end. Otherwise, the procedure proceeds to the block 66. When the inputted character is the mark "!", the variable $f_e$ is set to "1" if both the variables $f_r$ and $f_e$ are "O" and the procedure proceeds to the block 66, while the block 52 is regained when either the variable $f_r$ or $f_e$ is already "1". When the variable $f_r$ is found to be "1" at the block 66, the character inputted is transformed to a 16-bit-coded 8-bit code at a block 67. On the other hand, when $f_r$ is found to be "O", the inputted character is transformed to a 16-bit code at a block 68, the 16-bit code thus derived being transferred to a character string storing area at a block 69.

FIG. 7 illustrates a syntax tree resulting from the execution of the syntax analysis (block 23) together with tables of various information or data.

In FIG. 7, a numeral 70 denotes a table for holding indices of syntax trees each for a statement to be excecuted, and 71, 72 and 73 denote syntax tables containing data of nodes of the syntax trees. More specifically, 71 denotes the type or sort of the node, while 72 and 73 denote the numbers representative of points of branches from the nodes, respectively, which are listed in the tables differing one another in dependence on the node types. When an assignment statement is held at 71, then, 72 and 73 denote other nodes of the same syntax tree table. In case the types or sorts of the nodes are variables, constants and functions to be called, the table 72 holds the indices of the variable table 74 to 78, constant tables 79 to 82 and function tables 83 to 85.

The variable table includes items of variable name 74, data type 75, data 76 concerning presence or absence of initial value, data length 17 and allocated address 78. When the initial value is present, the index of the constant table is stored in the table 76 with the address being still undetermined. The function table contains function name 83, the number of argument (84), function address 85 which is still undetermined. The constant table contains constant data type 79, data length 80, allocated address 81 and index 82 of literal table 86, wherein the address 81 is not yet determined. The literal table 86 contains the existing character type data or the character string data.

Turning to FIG. 3, at a block 26, the character type variables 74 are allocated with areas of a size corresponding to the number of bits equal to the product of the data length 77 multiplied by 16 (sixteen) by referring to the aforementioned variable tables 74 to 78, the constant tables 79 to 82 and the literal table 86 (FIG. 8, blocks 90, 91 and 92), wherein the addresses of the allocated areas are set sequentially at the allocated address column 78 (FIG. 7), which is followed by the transcription of the initial values for the relevant variables 91 from the literal table 86. As to the constant data, those which constitute no initial values for the variables are each allocated with an area corresponding to the number of bits equivalent to that resulting from multiplication of the data length 80 by 16 (FIG. 8, blocks 93, 94), which is followed by the transcription of the values of the constants from the literal table 86 with the addresses being set at the address column 81 (FIG. 7).

The precedure described above is same as the character data allocating procedure conventionally carried out by the compiler except that one character is constituted by 16-bits and it is thus obvious tht the above mentioned procedure can be realized.

FIG. 9 is a schematic diagram for illustrating general operation of the OS 10 incorporated in the CPU 1 in response to the input/output request of the command processing program or CP 12.

When the CP 12 requests the OS 10 to execute a macro instruction 119 shown in FIG. 10 the address of the area for a first argument is set at a first area of an argument address list 103, while the addresses of the areas 105 of the second and other succeeding arguments are set at the second and other succeeding areas of the argument address list 103, wherein the leading address 103 of the argument address list is placed in a first register 101, to thereby call the program corresponding to the macro instruction from the OS 10 (as indicated by 110 in FIG. 9). The OS 10 can find a parameter address list 103 on the basis of the contents in the first register 101 and subsequently find individual parameters 104 to 106. Thus, the OS 10 can examine the content of the request commanded by the macro instruction to thereby search a directory 108 for determining predetermined information or data to thereby create a control table 107 or a system buffer 109 or alternatively consult with a control table 107 to issue a control command to a terminal input unit 100 (as indicated by 112 in FIG. 9) to allow the data transfer to be performed with the system buffer 109 (as indicated by 115 in FIG. 9), to thereby cause a completion code to be issued back to the control table 107 (as indicated by 113 in FIG. 9). If desired, the OS 12 may set the completion or end code in a record register 102 after the data have been set at the parameter areas 104, 105 and 106 to allow the control to be regained by the CP 12 (as indicated by 111 in FIG. 9). At the end of the macro instruction, the content of the second register 102 is set at the variable (completion code) on the left side to the equality sign.

As the macro instructions for the input/output, there can be mentioned instructions 120 to 124 illustrated in FIG. 11.

Figure 13:
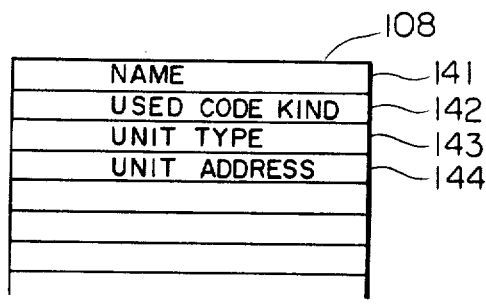
FIG. 13 is a view for illustrating a structure of an item of a directory.
Figure 15:
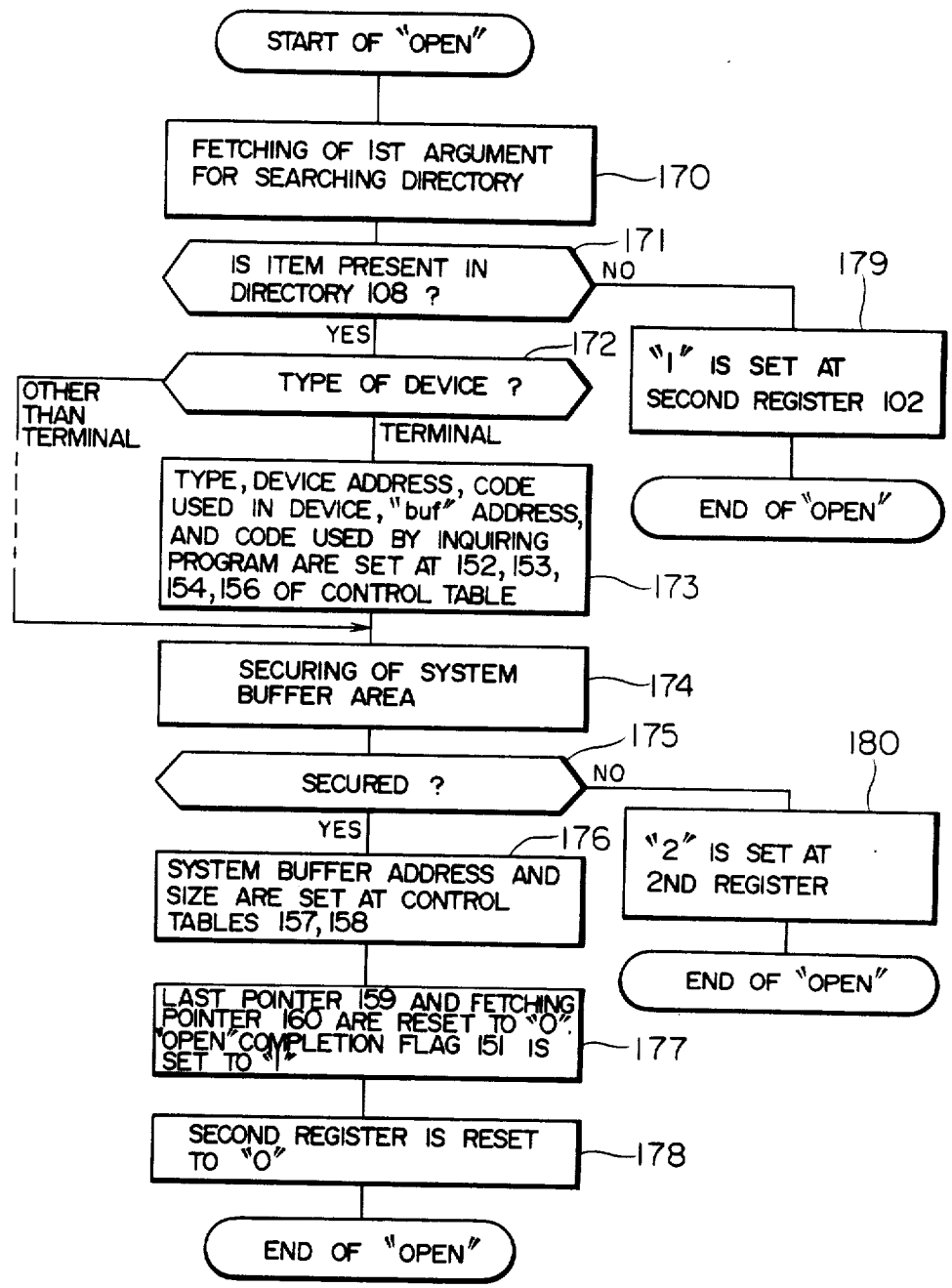
FIG. 15 is a flow chart for illustrating processing of an "open" macro instruction.

Now, description will be made of the case where data are inputted from the terminal input console 2 in FIG. 2 (denoted by 100 in FIG. 9). Referring to FIG. 12, it is assumed that declaration 131 of completion code area "cc", declaration 132 of buffer area "buf" and declaration 133 of pointer area "fd" for the control table are made and that a request "open" for the open processing in initialization is subsequently issued with the name of console input unit, "buf" and "fd" being used as the arguments (as shown at 134 in FIG. 12). The OS 10 searches the directory 108 on the basis of the first argument, as shown in FIG. 15 (block 170) to determine the relevant item. Referring to FIG. 13, one item of the directory 108 is composed of a name 141, a used code kind 142, a unit (device) type 143, and a unit address 144. In the case of the input terminal console, "console" is located at 141, the used code for the terminal is at 142, the symbol indicative of the terminal is at 13, and the address of the terminal input unit is located at 144.

Figure 14:
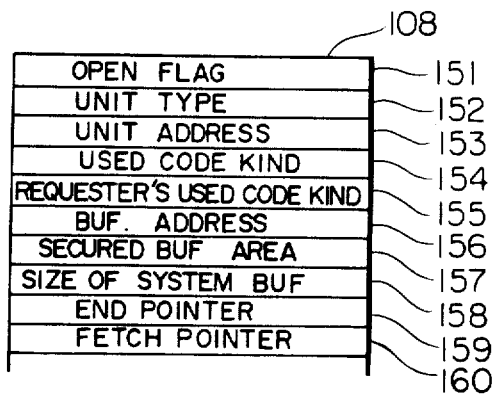
FIG. 14 is a view for illustrating a structure of control table.

When the relevant item is found in the directory 108 as searched (block 171 in FIG. 15), the OS 10 determines the terminal unit address 144, the used code kind 142 and the address "buf" from the relevant directory 108 and the argument address list 103 to set them in a control table shown in FIG. 14 at locations 152, 153, 154 and 156, respectively (block 173 in FIG. 15). Additionally, the type of the code used by the request issuing program 12 is determined and set in the table shown in FIG. 14 at a location 155 (block 173 in FIG. 15) for securing a buffer area for the system (block 174 in FIG. 15). If the buffer area can be secured (block 175) the address of that buffer area is set at 157 in the table in FIG. 14, while the size of the system buffer is set at 158 of the same table (block 176 in FIG. 15). Further, an end pointer 159 and a fetch pointer 160 are set to "O" with the address of the control table being set to "fd", and finally a completed "open" flag 151 is set to "1" (block 177 in FIG. 15).

The code type used in the execution of a program is determined by searching the relevant item of the CP 12 registrated in the directory by the OS 10 upon issuing of the request for activation of the CP 12 by the OS 10, whereby the program is loaded to start execution thereof. At that time, by setting the code type used in execution of the program in a program execution management table (not shown), the OS 10 is always in the position to know the code type used in a program which is being currently executed.

When all the succeeding "open" processings have been normally completed, the OS 10 sets "O" in the second register 102 (block 178 in FIG. 15), the CP 12 regains the control and sets the variable "cc" in the second register 102.

In response to a test instruction or command, the completion code "cc" is checked. When the latter is found "O", procedure procedes to the instruction 136 for executing the data fetching macro instruction. In executing the data fetching macro instruction 136, the "fd" determined through execution of the "open" macro instruction 134 designates the first argument while the number of characters to be fetched is designated by the second argument.

Figure 16:
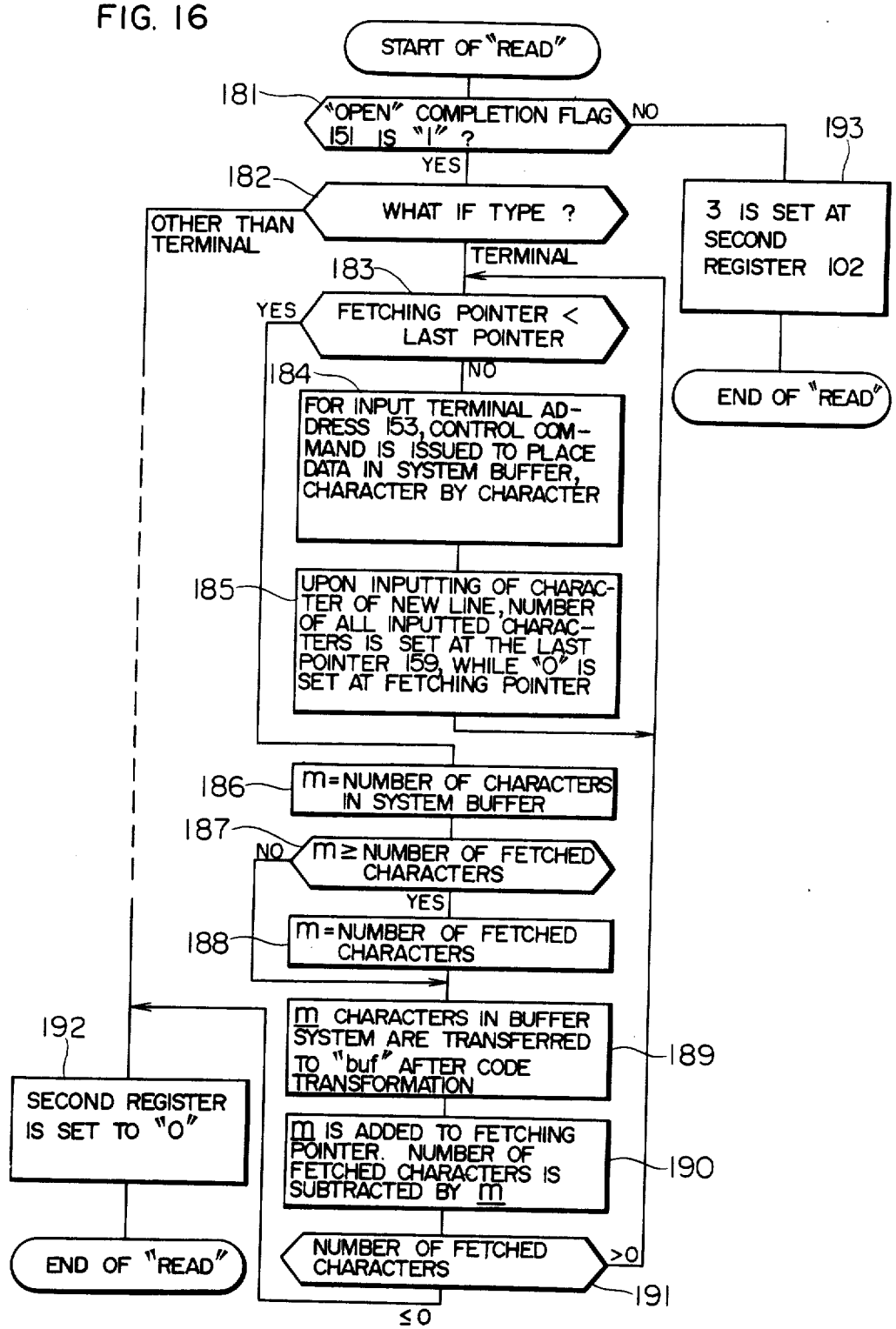
FIG. 16 is a flow chart illustrating a "read" macro instruction.

The processing performed by the OS 10 in that case will be described by referring to FIG. 16. At first, it is checked whether the control table given by "fd" has been correctly opened or not by checking the "open" completion flag 151 (at block 181). When the flag is found to be "1", the unit or device type 152 is checked (block 182). When the unit or device has been found to be a terminal, it is checked whether the data is still present in the system buffer by comparing a fetching pointer 160 with the last pointer 159 (block 183). If the data is absent, an input control command is sent to the key board (input terminal) address 153 to thereby cause the data to be loaded in the system buffer starting from the leading location thereof on the character-by-character basis (block 184). When a character for a new line is inputted, the number of all the characters inputted until then is set at the last pointer 159 while "O" is set at the fetching pointer (block 185), whereupon the block 183 is regained. On the other hand, when the data is present in the system buffer and found to correspond to a number m of characters (block 186), it is decided whether m is smaller than the number of characters designated or required by the second argument of the "read" macro instruction (block 187). When the result of decision is affirmative, the number m is changed to the number required (block 188). Subsequently, m characters in the system buffer are transferred to the buffer area "buf"

while executing a code transformation processing described hereinafter (block 189). Then, the fetching pointer is added with m, while the number of the characters to be fetched is subtracted by m. If the chracters to be fetched are still present, the block 183 is regained (block 191). Otherwise, the second register 102 is placed with "O" (block 192), whereupon the "read" procedure comes to an end.

It should however be mentioned that in conjunction with the blocks 185, 186, 187, 188, 189 and 190, the code type used in the device or unit and the code type 155 used in the program have to be discriminated from each other. More specifically, the character belonging to the new line should be understood in terms of the code 154 used in the unit or terminal. The same hold true for the number of characters in the block 186 and the number m mentioned in conjunction with the blocks 186 to 190. On the other hand, the number of the characters mentioned above in conjunction with the blocks 187, 188 and 190 should be understood in terms of the code 155 used in the program. It is further to be noted that the pointer placed in the system buffer becomes different with respect to the amount to be updated for each character in dependence on the types of the code used in the unit or terminal.

The foregoing description concerns an embodiment of the invention applied to the inputting from an input terminal unit (key board). However, the basic concept of the output operation through the output terminal unit or display is similar to that of the input operation through the input terminal unit or key board described above except that a "write" macro instruction 122 is used in place of the "read" macro instruction and that the direction of data flow as well as code transformation is reversed. Further, the input/output operation relative to the files stored in the SM 4 is similar to the input/output operation to the terminal in the basic concept except that amount of information or data contained in the directory 108 and the control table 107 is increased in the former case. The relevant technique has heretofore been established.

Further, data reception and transmission with the other input/output units 7 and 8 and the other CPU 9 connected to the communication line 6 through the COM 5 is basically similar to those for the input and output terminals (key board and display) except that processings for logically establishing the communication paths are required. The relevant techniques has heretofore been established also in this respect.

A "close" macro instruction 123 series to output the contents of the system buffer in the output phase of operation to thereby make free the system buffer and clear the control table. These functions can also be realized by resorting to known techniques.

The "create" macro instruction 124 is to create new files. More specifically, the directory 108 for the new files having a name designated by the first argument is created, wherein the code type given by the second argument is employed as the code 142 to be used in the file.

The "inquire" macro instruction 125 is to give the code kind used in the input/output unit, file or CPU designated by the name to the variable code. To this end, the OS 10 searches the directory 108 in respect to the name. If the name in concern is found, the used code type 142 specified in the directory is fetched to be given to the variable code. Otherwise, it is decided that an error occurs, whereby an error code is set at the second register 102 to complete this processing.

The "change" macro instruction 126 serves to change the code type used in the input/output unit, file or CPU as designated by the name to a code type given by the variable code. More specifically, the OS 10 search the directory 108 in respect to the name. If the name is found, the relevant used code type 142 listed at the item found in the directory is set with the used code type designated by the code. Otherwise, it is decided that an error occur, whereby the error code is set at the second register 102 to terminate this procedure.

In the following, code transformation upon the inputting from the key board will be described.

For describing the usage of the "inquire" macro instruction and the "change" macro instruction, it is assumed, by way of example, that data inputted through the input unit (key board) in which a code a is used is to be copied to a file where a code b is used. On the assumption, if the code used in the copying program belongs neither to the code a nor to the code b, than either of the codes a or b is checked by the "inquire" macro instruction, which is followed by alteration of the code used in the copying program itself with the and of the "change" macro instruction, to thereby suppress duplicate code transformations which would otherwise take place.

Turning back to FIG. 1, it is assumed that a coordinated or uniformized 16-bit code which results from coordination of a JIS 8-bit code and JIS Kanji (Chinese character) code is used in the key board unit 2 and the display unit 3, the JIS 8-bit code is used in the secondary memory of SM 4, and that admixed codes of EBCDIK code and KEIS kanji code are employed together with a shift code in the input/output units 7 and 8 and the second CPU 9 which are connected through the communication controller 5.

In connection with the coordinated 16-bit code, it is further assumed that the JIS 8-bit code is added with a preceding code of eight bits all of "O" to be thereby transformed to the 16-bit code. Additionally, it is assumed that in any of the admixed codes, only the EBCDIK code or alternatively the shift code is allowed to occupy the leading part.

Figures 17, 18:
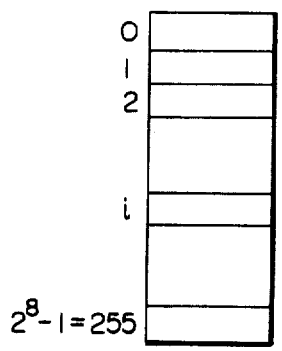
FIG. 17 is a view showing a table in a memory for determining code transformation processing based on code type.
FIG. 18 is a view for illustrating a table structure for code transformation.

Description will now be made in connection with an application in which a non-character code, the JIS 8-bit code, the admixed codes and the coordinated 16-bit code are to be handled. Here, with the phrase "non-character code", it is intended to mean that the code includes the data except for those of the character code, as the case of a binary data file. Further, the programs are dealt with as the non-chracter code program independent of the codes actually used in the programs FIG. 17 is a view for illustrating input vis-a-vis output relationships for determining a gross classification of the code transformation processings. In the figure, there are listed the various code types of input data rowwise at the left most column while they are enumerated columnwise on the topmost row, wherein transformation classifying numbers are entered at intersections of the rows and the columns. The combinations represented by the classification numbers 1 require no code transformation. Combination represented by the classification number 2 requires code transformation between the 8-bit codes. For carrying out this transformation, an intra-memory transformation table (i.e. table stored in a memory) of an 8-bit width including $2^8$ elements is prepared as illustrated in FIG. 17, and a value of the EBC- DIK code representing a same character that the value i of the JIS 8-bit code represents is entered at the i-th element (where i=0, ..., $2^{8-1}$) of the transformation table. On the conditions, transformation of the JIS 8-bit code to the EBCDIK code can be readily accomplished merely by referring to the intramemory transformation table.

The combination represented by the classification number 3 requires transformation of the admixed codes to the JIS 8-bit code. In case the admixed codes consist only of the KBCDIK codes, this transformation can be realized by using a reverse transformation table as in the case of the processing required for the combination identified by the number 2, wherein appearance of the KEIS kanji code is processed as an error to terminate the macro instruction processing by setting an error code in the second register 102.

Combination represented by the classification number 4 requires only the processing for adding eight bits all of "0" in precedence to the inputted JIS 8-bit code to thereby create the 16-bit code.

Processing for the combination represented by the classification number 5 is reverse to the processing for the combination represented by the classification number 4. Namely, when the preceding (more significant) eight bits of the inputted 16-bit code are all "0s", only the remaining eight bits are allowed to be outputted.

Otherwise, it is decided that an error occurs, and the error code is set in the second register 102 to thereby teminate the processing for the instant macro-instruction.

Figure 19:
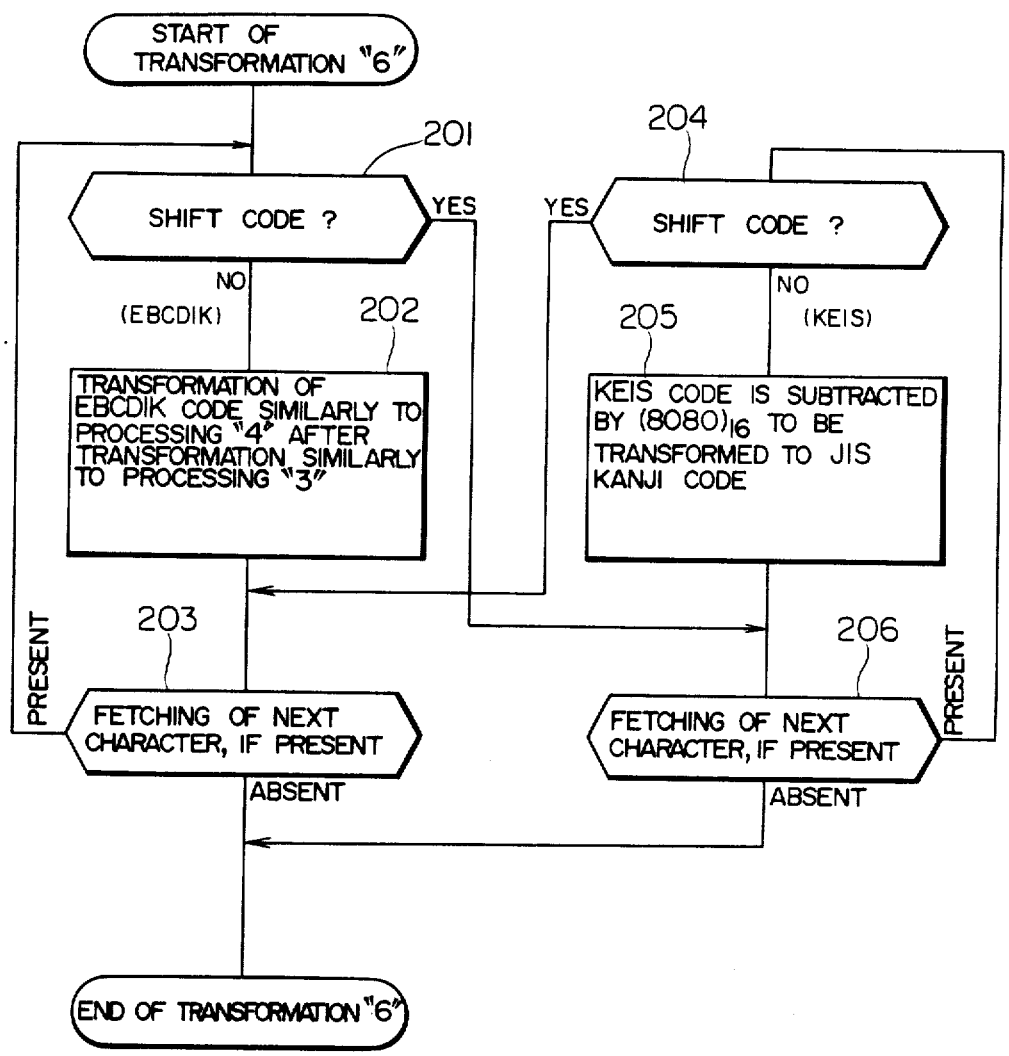
FIGS. 19 and 20 are views for illustrating flows of code transformation processings, respectively.

In the processing of combination represented by the classification number 6, it is first checked whether or not the shift code is involved, as illustrated in FIG. 19 at a block 201. If the result is negative, this means that the code is the EBCDIK code. Accordingly, this EBCDIK code is transformed to a corresponding JIS 8-bit code as in the case of the processing for the combination identified by the classification number 3, wherein the resultant code is added with the eight preceding bits each of "0" as in the case of the processing for the combination identified by 4, to thereby prepare a 16-bit code (block 202). When the checking at the block 201 results in the shift code, a succeeding code is fetched (block 206). When the succeeding code is not the shift code, it is then necessarily a KEIS code. Accordingly, through subtraction of $(8080)_{16}$ from the KEIS code, the latter can be transformed to a JIS Kanji code (block 205). When the code fetched at the checking block 204 is again the shift code, a next code is again fetched (block 203) to repeat the check as to the shift code (block 201). In any case, when a succeeding character is no more found, this processing comes to an end.

Figure 20:
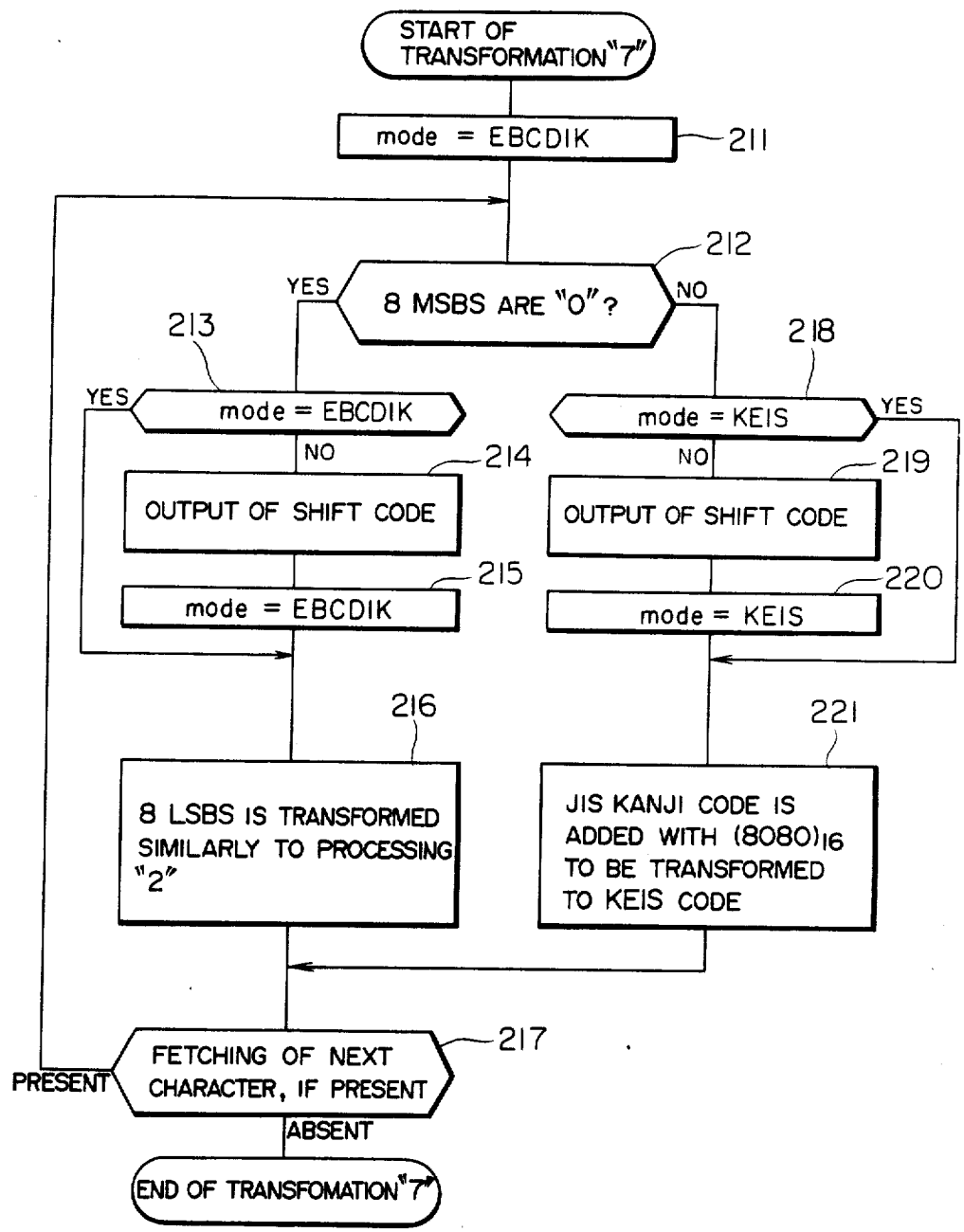

The processing for the combination represented by the classification number 7 is reverse transformation relative to the processing for the combination identified by the number 6. In this processing, the eight more significant bits are checked as to whether they are "0s" or not, as illustrated in FIG. 20 at a block 212. If so, the eight less significant bit represent a JIS 8-bit code, which consequently undergoes the processing described above in conjunction with the combination 2, to be transformed to a corresponding EBCDIK code (block 216). Unless the eight more significant bits are "0s", this means a JIS Kanji code, which is thus added with $(8080)_{16}$ to be transformed to a KEIS code (block 221). In the case of the processing now being considered, the shift code must be inserted when the output mode is changed over to the EBCDIK code outputting mode and the KEIS code outputting mode, respectively. As the consequence, this processing additionally requires initialization of mode (block 211), decisions (blocks 213, 218), outputting of the shift code (blocks 214, 219) and the updating of modes (blocks 215, 220).

The code transformation methods described above is not restricted to the code types mentioned above but can be applied to code transformations of other code types.

The foregoing description has been made with emphasis put on the OS function. It should however be understood that the concept of the invention can be equally applied to combinations of the OS and channels, programs operative in cooperation with other OSs or virtual OSs of virtual computer systems.

As will be appreciated from the foregoing description, the codes including those representing alphanumeric character, kana (the Japanese alphabet) and symbol and the code representing Kanji (Chinese character) can be processed with the data of a same length according to the teachings of the invention, whereby the processing program for handling the data in which these codes are admixedly present can get rid of the necessity to discriminatively determine the length of every individual data. This in turn means that the productivity as well as maintenance immunity of the program can be significantly improved. Further, by virtue of the capability of transformation among different types of codes at the level of the OS, the user can be relieved from the necessity of processing data for the code transformation and modifying program to deal with difference among the code systems. Further, in case the information processing system according to the invention is connected to a host computer in which code types differing from those adopted in the inventive processing system are used, programs can be developed without taking into consideration the difference among the code systems. Besides, since the code transformation and the like processings need not be carried out separately, the necessity for development of a program in duplicate can be evaded.

What is claimed:

1. A method of processing a plurality of code systems in an information processing apparatus including an operating system, comprising:
   a step of inputting a source program; and
   a compiling step of analyzing meaning of said source program to create a series of instructions and data required for executing processing equivalent to said meaning;
   wherein said compiling step including a substep of transforming character type constants to a first code system occupying a region including a first number of bits and transforming character string constants to a second code system occupying a region including a number of bits which is equal to a product of a sum of the number of characters of said character string constants plus one and multiplied with said first bit number so that character type variables designated in said source program correspond, respectively, to the region of said first bit number while a character type array corresponds to a region including a number of bits which is equal to a product resulting from multiplication of said first bit number with the number of elements of said array.

2. A method of processing a plurality of code systems according to claim 1, further including a step of managing in a batch data input/output requests issued by peripheral units and a communication controller connected to said information processing apparatus by using of macro instructions.

3. A method of processing a plurality of code systems according to claim 1, further including a step of storing and managing the type of code system generated by an input unit connected to said information processing apparatus and the type of code system received by an output unit connected to said information apparatus for each of said input and output units, a step of storing and managing the types of code systems used by executable program in said information processing apparatus for each of said executable programs, a step of comparing the code system used in said input unit with the code system used in said executable program for transforming said input to the code system used in said executable program, and a step of transferring data to said executable program and receiving data from said executable program to subsequently compare the type of the code system used in said output unit with the type of the code system used in said executable program for transforming said output to the code system used in said ouptut unit, said data being then supplied to said output unit.

4. A method of processing a plurality of code systems according to claim 1, further including a step of storing and managing types of the code systems used separately for each of sets of data stored in a secondary memory, a step of comparing the type of code system used in said set of data with the type of the code system used in said executable program to transform data to the code system to be used in said executable program after having read said data from said set or transform to the code system to be used in said set of data before writing said data in said set.

5. A method of processing a plurality of code systems according to claim 1, further including a step of storing and managing the types of code systems used in input/output units and processing units connected to a communication controller through communication lines so as to be communicatable with said information processing unit for each of said input/output units and said processing units, a step for comparing the type of the code system used in an executable program with the types of the code systems used in said input/output units and said processing units for transforming data from said communication controller to the code system used in said executable program before reception of said data from said communication controller or transforming data to be supplied to said communication controller to the code system used in said input/output unit and said processing unit before transmission of said data to said communicaiton controller.

6. A method of processing a plurality of code systems according to claim 1, further including a step of examining the code used in an executable program in respect to the character type data for parameters of the macro instruction issued to said operating system from said executable program for transforming the code used in said executable program to the code of said first code system upon fetching of said character type data from said parameters, and a step of transforming said code os said first code system to the code of said code system used in said executable program upon returning of said character type data to said parameters.

7. A method of processing a plurality of code systems according to claim 1, wherein the type of the code system is given in response to an inquiry about the type of the code system, while for dealing with the request for modifying the code system used in an executable program to the same code system as inquired or to the code system at the location designated by said executable program, the type of the code system used in said executable program and the type of the code system as inquired or the type of said designated code system are stored and managed so as to be subsequently used in said executable program.

8. A method of processing a plurality of code systems according to claim 2, wherein the type of the code system is given in response to an inquiry about the type of the code system, while for dealing with the request for modifying the code system used in said executable program to the same code system as inquired or to the code system at the location designated by said executable program, the type of the code system used in said executable program and the type of the code system as inquired or the type of said designated code system are stored and managed so as to be subsequently used in said executable program.

9. A method of processing a plurality of code systems according to claim 3, wherein the type of the code system is given in response to an inquiry about the type of the code system, while for dealing with the request for modifying the code system used in said executable program to the same code system as inquired or to the code system at the location designated by said executable program, the type of the code system used in said executable program and the type of the code system as inquired or the type of said designated code system are stored and managed so as to be subsequently used in said executable program.

10. A method of processing a plurality of code systems according to claim 4, wherein the type of the code system is given in response to an inquiry about the type of the code system, while for dealing with the request for modifying the code system used in said executable program to the same code system as inquired or to the code system at the location designated by said executable program, the type of the code system used in said executable program and the type of the code system as inquired or the type of said designated code system are stored and managed so as to be subsequently used in said executable program.

11. A method of prosessing a plurality of code systems according to claim 5, wherein the type of the code system is given in response to an inquiry about the type of the code system, while for dealing with the request for modifying the code system used in said excutable program to the same code system as inquired or to the code system at the location designated by said executable program, the type of the code system used in said executable program and the type of the code system as inquired or the type of said designated code system are stored and managed so as to be subsequently used in said executable program.

12. A method of processing a plurality of code systems according to claim 6, wherein the type of the code system is given in response to an inquiry about the type of the code system, while for dealing with the request for modifying the code system used in said executable program to the same code system as inquired or to the code system at the location designated by said executable program, the type of the code system used in said executable program and the type of the code system as inquired or the type of said designated code system are stored and managed so as to be subsequently used in said executable program.

* * * * *